(12) United States Patent
Hoshino et al.

(10) Patent No.: US 9,688,090 B2
(45) Date of Patent: Jun. 27, 2017

(54) IDENTIFICATION MEDIUM

(71) Applicant: NHK SPRING CO., LTD., Yokohama-shi, Kanagawa (JP)

(72) Inventors: Hidekazu Hoshino, Yokohama (JP); Itsuo Takeuchi, Yokohama (JP); Tokio Sakauchi, Yokohama (JP); Tooru Ida, Yokoahama (JP); Shinei Suzuki, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 0 days.

(21) Appl. No.: 14/432,794

(22) PCT Filed: Oct. 2, 2013

(86) PCT No.: PCT/JP2013/076829
§ 371 (c)(1),
(2) Date: Apr. 1, 2015

(87) PCT Pub. No.: WO2014/054696
PCT Pub. Date: Apr. 10, 2014

(65) Prior Publication Data
US 2015/0323898 A1    Nov. 12, 2015

(30) Foreign Application Priority Data
Oct. 5, 2012    (JP) ................. 2012-222978

(51) Int. Cl.
*B42D 25/47*    (2014.01)
*B42D 25/29*    (2014.01)
(Continued)

(52) U.S. Cl.
CPC ............ *B42D 25/47* (2014.10); *B42D 25/00* (2014.10); *B42D 25/29* (2014.10); *B42D 25/328* (2014.10);
(Continued)

(58) Field of Classification Search
None
See application file for complete search history.

(56) References Cited

U.S. PATENT DOCUMENTS 5,683,774 A * 11/1997 Faykish ................ G09F 3/0292
283/101
5,700,550 A * 12/1997 Uyama .................... B32B 33/00
283/72
(Continued)

FOREIGN PATENT DOCUMENTS

EP    2096154    * 9/2009
JP    09-006217    * 1/1997
(Continued)

OTHER PUBLICATIONS

Dec. 17, 2013 International Search Report issued in International Patent Application No. PCT/JP2013/076829.
(Continued)

*Primary Examiner* — Martin Angebranndt
(74) *Attorney, Agent, or Firm* — Oliff PLC

(57) ABSTRACT

An identification medium can be used in an opening label, clearly show signs of it having been opened, and also have a superior authenticity-confirming function. The identification medium has a structure including, in the following order as seen from the side of observation: an optical function layer that generates a color shift, a separation layer that is partially formed, a printed layer, and an adhesive layer, in which when an adhesive strength between the adhesive layer and an adherend is set to be Xa, an adhesive strength between the adhesive layer and the printed layer is set to be Xb, and an adhesive strength at a portion in which the separation layer is laminated between the optical function layer and the printed layer is set to be Xc, the adhesive strength of each part is set to satisfy $Xa>Xb>Xc$ or $Xb>Xa>Xc$.

1 Claim, 1 Drawing Sheet

(51) Int. Cl.
*B42D 25/328* (2014.01)
*B42D 25/364* (2014.01)
*G03H 1/02* (2006.01)
*G09F 3/03* (2006.01)
*G03H 1/00* (2006.01)
*G09F 3/00* (2006.01)
*B42D 25/00* (2014.01)
*G02B 5/32* (2006.01)

(52) U.S. Cl.
CPC ......... *B42D 25/364* (2014.10); *G03H 1/0011* (2013.01); *G03H 1/0256* (2013.01); *G09F 3/0291* (2013.01); *G09F 3/0292* (2013.01); *G09F 3/0294* (2013.01); *G09F 3/03* (2013.01); *G09F 3/0376* (2013.01); *B42D 2033/26* (2013.01); *G02B 5/32* (2013.01)

(56) References Cited

U.S. PATENT DOCUMENTS

| | | | |
|---|---|---|---|
| 6,482,489 B1 * | 11/2002 | Otaki | G03H 1/0248 428/195.1 |
| 6,761,959 B1 * | 7/2004 | Bonkowski | B42D 25/373 359/2 |
| 2002/0142121 A1 * | 10/2002 | Hingsen-Gehrmann | G02B 5/128 428/40.1 |
| 2002/0191233 A1 * | 12/2002 | Ishimoto | G03H 1/02 359/1 |
| 2002/0191234 A1 | 12/2002 | Ishimoto et al. | |
| 2006/0193021 A1 | 8/2006 | Ishimoto et al. | |
| 2007/0077404 A1 | 4/2007 | Hoshino et al. | |
| 2007/0081144 A1 * | 4/2007 | Hoshino | G09F 3/02 356/71 |
| 2011/0031148 A1 * | 2/2011 | Rosendall | B65D 73/0028 206/459.1 |
| 2012/0127546 A1 | 5/2012 | Sugiura et al. | |

FOREIGN PATENT DOCUMENTS

| | | | |
|---|---|---|---|
| JP | H09-277423 A | | 10/1997 |
| JP | 10-044694 | * | 2/1998 |
| JP | H10-116031 A | | 5/1998 |
| JP | 2002-351290 A | | 12/2002 |
| JP | 2003-084672 A | | 3/2003 |
| JP | 2009073006 | * | 4/2009 |
| JP | 4565541 B2 | | 10/2010 |
| WO | 2005/043493 A1 | | 5/2005 |

OTHER PUBLICATIONS

May 9, 2016 Search Report issued in European Patent Application No. 13843570.6.

* cited by examiner

Xa > Xb > Xc or Xb > Xa > Xc

Xa > Xb > Xc

Xb > Xa > Xc

IDENTIFICATION MEDIUM

TECHNICAL FIELD

The present invention relates to an identification medium for determining whether or not foodstuffs, passports, documents, various cards, passes, bills, exchange tickets for money, bonds, security notes, gift certificates, pictures, tickets, public race betting tickets, recording media in which sound data and image data are recorded, recording media in which computer software is recorded, various parts, various products, garments and packages thereof are authentic.

BACKGROUND ART

Opening labels having a forgery prevention function that can show signs of an item having been opened are well known. For example, transferring type seals are disclosed in Patent Publication 1, and non-transferring type seals are disclosed in Patent Publication 2. In addition, a technique that can prevent the reuse of opening seals is disclosed in Patent Publication 3.

Patent Publication 1 is Japanese Unexamined Patent Application Publication No. Hei 9-277423. Patent Publication 2 is Japanese Unexamined Patent Application Publication No. 2003-846672. Patent Publication 3 is Japanese Patent Publication No. 4565541.

DISCLOSURE OF THE INVENTION

Problems Solved by the Invention

However, in the above techniques, the function that can clearly show signs of it having been opened (that is, a reuse prevention function) was inferior. Furthermore, an opening label is desired to have an authenticity confirming function in an unopened state, that is, a function that can visually identify whether the opening label is not a forgery. In view of such circumstances, an object of the present invention is to provide an identification medium that can be used in an opening label, which can clearly show signs of it having been opened, and which can also have a superior authenticity confirming function.

Means for Solving the Problems

A first aspect of the present invention has an identification medium having a structure including, in the following order as seen from the side of observation: an optical function layer that generates a color shift, a separation layer that is partially formed, a printed layer having specific colors, and an adhesive layer, in which when an adhesive strength between the adhesive layer and an adherend is set to be Xa, an adhesive strength between the adhesive layer and the printed layer is set to be Xb, and an adhesive strength at a portion in which the separation layer is laminated between the optical function layer and the printed layer is set to be Xc, the adhesive strength of each part is set to satisfy: Xa>Xb>Xc or Xb>Xa>Xc.

According to the first aspect of the present invention, authenticity of the identification medium can be confirmed by a color shift in a state in which it is adhered to the adherend.

In the case in which the adhesive strength of each part satisfies Xa>Xb>Xc, when the identification medium is torn off from the adherend, first, the layers are separated at a portion of Xc, and next, the layers are separated at a portion of Xb. Therefore, the printed layer is divided, and a portion of the separation layer in the identification medium remains at an adherend side. At a part in which the separation layer is not formed, the printed layer 106 is separated from the adhesive layer 107. As a result, the identification medium is broken, part of the printed layer remains on a torn off layer, and the adhesive layer and the printed layer partially remaining thereon (part of the broken identification medium) remain on the surface of the adherend. In this way, signs that the identification medium adhered to the adherend has been torn off remain. Here, the torn off identification medium is broken, the printed layer partially remains, and therefore, signs of it having been torn off clearly remain, and the identification medium cannot be reused.

In addition, in the case in which the adhesive strength of each part satisfies Xb>Xa>Xc, when the identification medium is torn off from the adherend, a portion of Xc is first torn off, and therefore, the torn off portion can be visually recognized. That is, signs of it having been torn off from the adherend remain in the identification medium.

The printed layer is formed by printing and fixing ink material in a layered state, and the strength as a layer is low. Therefore, in the case in which the adhesive strength of each part satisfies Xa>Xb>Xc, the printed layer is easily broken, and part of the printed layer reliably remains on both the surface of the torn off identification medium and the surface of the adherend. On the other hand, in the case in which the adhesive strength of each part satisfies Xb>Xa>Xc, the printed layer is cohered after a clearance is formed at the portion of Xc between the printed layer and the optical function layer, and therefore, it can be clearly recognized that the printed layer has disappeared. That is, by forming so that an interlayer is separated at the portion of the printed layer, signs of it having been torn off from the adherend will reliably remain in the identification medium in either case.

A second aspect of the present invention has an identification medium according to the first aspect of the present invention, in which the optical function layer comprises a cholesteric liquid crystal layer in which a hologram processing is carried out, and a multiple film layer in which multiple optical transparent films having a different refractive index are laminated. According to the second aspect of the present invention, the identification medium can be identified by a color shift of the cholesteric liquid crystal layer and the multiple film layer by direct observation, and in addition, it can be identified by observing a hologram by observation through a circular polarized filter.

A third aspect of the present invention has an identification medium according to the first aspect or the second aspect of the present invention, in which the separation layer has formed thereon a drawn pattern. According to the third aspect of the present invention, it is recognized from the drawn pattern that the identification medium has been torn off from the adherend, and as a result, an effect for preventing unauthorized reuse of the identification medium can be further increased. Here, as a drawn pattern, letters, figures, patterns, etc., can be used.

A fourth aspect of the present invention has an identification medium according to any one of the first aspect to the third aspect of the present invention, further includes a printed layer formed in the optical function layer or a printed layer formed close to the optical function layer. According to this aspect of the present invention, a design such as a logo, etc., can be further added.

A fifth aspect of the present invention has an identification medium according to the first aspect of the present invention, in which the optical function layer is a cholesteric liquid crystal layer in which a hologram processing is carried out.

A sixth aspect of the present invention has an identification medium according to the first aspect of the present invention, in which the optical function layer is a multiple film layer in which multiple optical transparent films having different refractive indexes are laminated.

A seventh aspect of the present invention has an identification medium according to any one of the first aspect to the sixth aspect of the present invention, in which when $Xb>Xa>Xc$ is satisfied, the printed layer and the adhesive layer are cohered in an area in which the separation layer is formed, and a pattern of the printed layer in the area disappears, by tearing off the identification medium from the adherend.

Effects of the Invention

According to the present invention, the identification medium can be used in the opening label, can clearly show signs of it having been opened, and can also have a superior authenticity confirming function.

Figure 1:
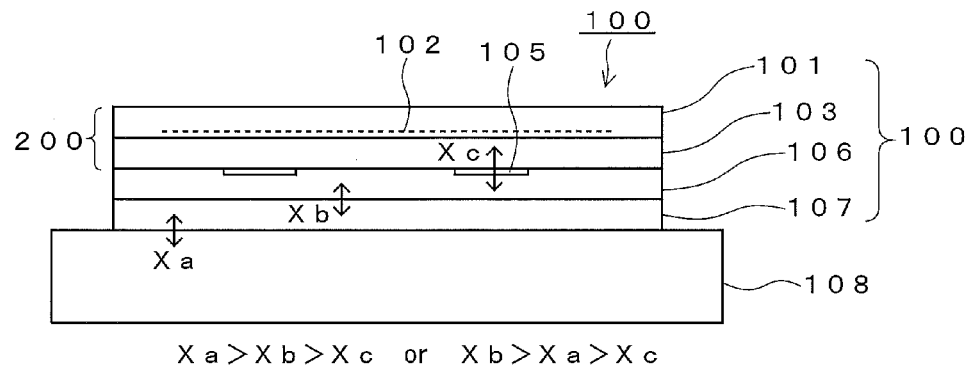
FIG. 1 is a side cross sectional view showing an identification medium according to an embodiment of the present invention.

EXPLANATION OF REFERENCE NUMERALS 100 denotes an identification medium, 101 denotes a cholesteric liquid crystal layer, 102 denotes a hologram processing, 103 denotes a multiple film layer, 105 denotes a separation layer, 106 denotes a printed layer, 106a denotes a remaining printed pattern, 106b denotes a remaining printed pattern, 106c denotes a thinned portion in a printed layer, 107 denotes an adhesive layer, 108 denotes an adherend, 110 denotes an identification medium piece, 111 denotes an identification medium piece, 112 denotes a residue, 113 denotes a cohered area, and 200 denotes an optical functional layer.

MODE FOR CARRYING OUT THE INVENTION

First Embodiment
Structure

FIG. 1 shows a cross sectional structure of an identification medium 100. The identification medium 100 has a structure that is laminated with a cholesteric liquid crystal layer 101, a multiple film layer 103, a separation layer 105 that is partially formed, a printed layer 106 and an adhesive layer 107, in that order, from an observing side (an upper direction in the figure). The identification medium 100 is adhered to an adherend (an object to which the identification medium 100 is adhered) 108 by an adhesion function of the adhesive layer 107. The adherend 108 may be various articles to be identified, packages thereof, etc.

The cholesteric liquid crystal layer 101 has a thickness of 0.5 to 5 µm, and is set to selectively reflect right circular polarization light having a red center wavelength (right rotating type circular polarization light). This setting is mere one example, and the center wavelength of the selectively reflected light may be another color (for example, green, etc.). The selectively reflected light may be left circular polarization light. A hologram processing 102 is formed by pressing an embossed die onto the cholesteric liquid crystal layer 101. When the light reflected by the cholesteric liquid crystal layer 101 is observed, a hologram image formed by the hologram processing 102 is observed. This hologram image is optional, and as a hologram image, drawn patterns that can be identified when visualized, are selected. Here, a transparent protective layer (not shown) may be formed on an exposed surface (an upper surface in the figure) of the cholesteric liquid crystal layer 101. This protective layer is made of an optical transparent material that does not disturb a polarization state of transmitted light (for example, a triacetylcellulose film).

The cholesteric liquid crystal layer 101 has a multilayer structure, and a colored shift due to interference of light reflected by an interface of each layer is observed. This is a phenomenon in which a wavelength intensified by interference of reflected light which is reflected by the multiple interfaces shifts to a shorter wavelength side, when an angle between a perpendicular direction to the layer and a line of sight is increased (that is, the cholesteric liquid crystal layer 101 is inclined to the line of sight). For example, in the case in which the cholesteric liquid crystal layer is directly observed, first color viewed from a perpendicular direction is red, and then, the observed color of interfered light changes from red to orange, . . . , green, . . . blue, as the cholesteric liquid crystal layer is gradually inclined.

The multiple film layer 103 has a structure that is alternately laminated with optical transparent films having a different refractive index (for example, 100 to 200 layers). For example, the multiple film layer 103 has a thickness of 10 to 20 µm. An optical function layer 200 is formed by the cholesteric liquid crystal layer 101 and the multiple film layer. In the multiple film layer 103, the colored shift can be observed in the same manner as in the cholesteric liquid crystal layer 101.

The separation layer 105 is formed in a specific drawn pattern (for example, a character, diagram, etc.) using silicones, fluorine-treated materials, or waxes. A thickness of the separation layer 105 is set to be about 5 to 20% of the thickness of the printed layer 106.

The printed layer 106 is a layer formed by printing using ink as a raw material. The printed layer 106 is formed using specific color ink that is not transparent. The printed layer 106 may be monochrome, and it may be of multiple colors in which a pattern is formed by many colors. For example, the printed layer 106 has a thickness of 1 to 10 µm.

The adhesive layer 107 is formed by an adhesive, and for example, it has a thickness of 10 to 30 µm. The identification medium 100 is adhered and fixed to the adherend 108 by the adhesive layer 107. The adhesive layer 107 may be transparent, and it may be colored. Here, a separator (a release paper), which is not shown, is adhered to an exposed surface of the adhesive layer 107, before the identification medium 100 is adhered to the adherend 108. The identification medium 100 is adhered to the adherend 108 by tearing off this separator from the adhesive layer 107 and by pressing the exposed surface of the adhesive layer 107 to the adherend 108.

Examples of Transferring Type Label

The transferring type label is a label in which a part of the identification medium 100 remains on the adherend 108 when it is torn off from the adherend 108. In this case, when an adhesive strength (force required to tear off) between the adhesive layer 107 and the adherend 108 is assumed to be Xa, an adhesive strength between the adhesive layer 107 and the printed layer 106 is assumed to be Xb, and an adhesive strength at a portion in which the separation layer 105 is laminated between the printed layer 106 and the multiple film layer 103 is assumed to be Xc, the adhesive strength of each part is set to satisfy Xa>Xb>Xc.

Here, as a setting method to satisfy Xa>Xb>Xc, a method in which the adhesive strength between the printed layer 106 and the adhesive layer 107 is intentionally decreased by adding additives that reduce fixing strength of an object to be printed, such as fluororesin, wax, etc., to ink material for forming the printed layer 106, can be used. As another example of this method, a method in which the adhesive strength between the printed layer 106 and the adhesive layer 107 is adjusted by forming a thin layer which is made of material for reducing the adhesive strength (for example, a layer made of wax-containing material) between the printed layer 106 and the adhesive layer 107, can be used.

Example of Non-transferring Type Label

The non-transferring type label is a label in which the identification medium 100 does not remain on the adherend 108 when it is torn off from the adherend 108. In this case, when an adhesive strength (force required to tear off) between the adhesive layer 107 and the adherend 108 is assumed to be Xa, an adhesive strength between the adhesive layer 107 and the printed layer 106 is assumed to be Xb, and an adhesive strength between the separation layer 105 and the multiple film layer 103 is assumed to be Xc, the identification medium 100 can be formed as a non-transferring type label by setting the adhesive strength of each part to satisfy Xb>Xa>Xc. Here, in the non-transferring type label, the identification medium 100 is perfectly torn off from the object, and signs of it having been torn off remain on the identification medium 100.

As a method for setting so as to satisfy Xb>Xa, a method for increasing Xb to be greater than Xa using a synergistic effect of the material which forms the printed layer 106 and the adhesive which forms the adhesive layer 107, can be used.

Optical Function

In a state shown in FIG. 1, when the identification medium 100 is directly observed from a cholesteric liquid crystal layer 101 side (an upper portion in FIG. 1), red right circular polarization light reflected by the cholesteric liquid crystal layer 101 and light reflected by the multiple film layer 103 are observed. Here, when an angle of line of sight is changed by inclining the identification medium 100, the color of the reflected light reflected by the cholesteric liquid crystal layer 101 and the multiple film layer 103 shifts to a shorter wavelength side.

Then, when the identification medium 100 is observed from a cholesteric liquid crystal layer 101 side (an upper portion in FIG. 1) through a right circular polarizing filter which selectively allows right circular polarization light to pass therethrough, the red right circular polarization light reflected by the cholesteric liquid crystal layer 101 is preferentially visible and the hologram image based on the hologram processing 102 is clearly shown.

In addition, when the identification medium 100 is observed from a cholesteric liquid crystal layer 101 side (an upper portion in FIG. 1) through a left circular polarizing filter which selectively allows left circular polarization light to pass therethrough, the red right circular polarization light reflected by the cholesteric liquid crystal layer 101 is cut off by the left circular polarizing filter, and therefore, the hologram image is not visible, and the reflected light reflected by the multiple film layer 103 is preferentially shown.

By the above optics function, the authenticity of the decision of identification medium 100 adhered to the object can be confirmed.

Reuse Prevention Function of Transferring Type Label

Figure 2:
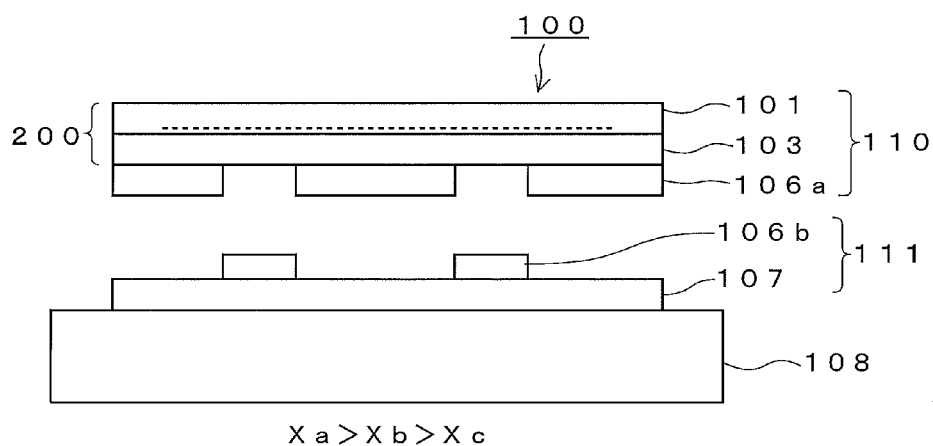
FIG. 2 is a side cross sectional view showing an identification medium according to an embodiment of the present invention.

A reuse prevention function in the case in which the adhesive strength of each part is set to satisfy Xa>Xb>Xc and the identification medium 100 is a transferring type label, will be explained. In this case, when the identification medium 100 is torn off from the adherend 108 in a state shown in FIG. 1, first, a portion of Xc is torn off, and next, a portion of Xb is torn off. As a result, the printed layer 106 is broken, in which the strength as a layer is equal to zero, so as to be a state shown in FIG. 2. In this case, the identification medium 100 is separated into an identification medium piece 110 that can be torn off and an identification medium piece 111 that remains on the surface of the adherend 108. Here, by dividing the printed layer, a printed layer pattern 106*a* that is part of the printed layer 106 remain in the identification medium piece 110, and a printed layer pattern 106*b*, which is part of the printed layer 106, remains in the identification medium piece 110.

Since the identification medium piece 110 has the printed layer pattern 106*a*, it can be easily recognized that it has been forcibly torn off from the adherend 108 once it is adhered. Since the identification medium piece 111 similarly has the printed layer pattern 106*b*, it can be clearly recognized that the genuine identification medium 100 adhered has been torn off. For example, a state of the identification medium 100 shown in FIG. 2, that is, a state in which it is easily visually recognized that the identification medium 100 has been forcibly torn off from the adherend 108, can be obtained by using a pattern of letters or marks for attracting attention as a pattern in the printed layer patterns 106*a* and 106*b* (that is, a separation layer 105). Therefore, unauthorized reuse of the identification medium 100 is prevented.

Reuse Prevention Function of Non-Transferring Type Label

A reuse prevention function in the case in which the adhesive strength of each part is set to satisfy Xb>Xa>Xc and the identification medium 100 is a non-transferring type label, will be explained. In this case, when the identification medium 100 is torn off from the adherend 108 in a state shown in FIG. 1, first, a portion of Xc is torn off, and next, a portion of Xa is torn off. In this state, the printed layer 106 and the adhesive layer 107 are not supported, and as a result, the printed layer 106 and the adhesive layer 107 are cohered in a cohered area 113.

The printed layer 106 in the cohered area 113 is primarily absorbed in the printed layer 106 around the cohered area 113 by this cohesion, and part thereof remains as a residue in this area. The adhesive layer 107 in the cohered area 113 is also similarly absorbed in the adhesive layer 107 around the cohered area 113, and part thereof remains as a residue in this area. Reference numeral 112 denotes a cohesion formed by these residues and the remaining separation layer 105. The printed layer 106 substantially disappears in the cohered area 113 by generating this cohesion, as show in FIG. 3 (in some cases, the residue 112 is observed; however, in most cases, the printed pattern does not substantially function and is changed to a transmitting pattern in which the printed pattern comes off and light penetrates). In this way, though the identification medium 100 is not separated, the printed layer 106 disappears by the cohesion, and a pattern in a disappeared area stands out so as to be observed. That is, it can be clearly recognized that the identification medium 100 has been torn off in an unauthorized manner. Therefore, unauthorized reuse of the identification medium 100 can be prevented.

Figure 3:
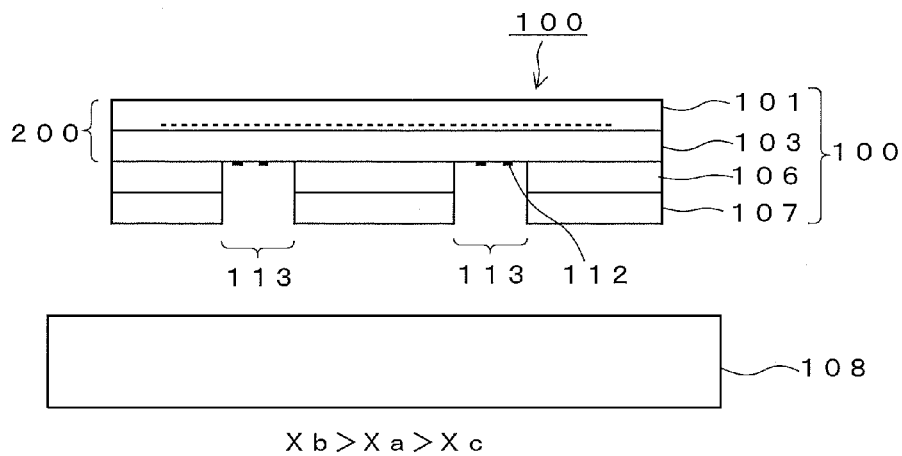
FIG. 3 is a side cross sectional view showing an identification medium according to an embodiment of the present invention.

For example, when the pattern in the cohered area 113 is formed by a drawn pattern such as a letter or figure, the pattern in the cohered area 113 is changed to be transparent in a state shown in FIG. 3, and this transparent pattern can be clearly observed through an optical function layer 200.

Production Method

An example of a process for producing the identification medium 100 will be explained. First, a cholesteric liquid crystal layer 101 is formed on a substrate (not shown), and a hologram processing 102 is carried out by embossing on the cholesteric liquid crystal layer 101. On the other hand, a multiple film layer 103 is prepared, and a pattern of the separation layer 105 is formed on part of one surface of the multiple film layer 103. In this case, the separation layer 105 is formed so as to partially form a specific drawn pattern. Next, the printed layer 106 using ink is formed on a surface of the multiple film layer 103 in which the separation layer 105 is formed, and in addition, the adhesive layer 107 is formed. Then, a separator (not shown) is adhered to an exposed surface of the adhesive layer 107. Finally, the cholesteric liquid crystal layer 101 is torn off from the substrate (not shown), and it is adhered using a transparent adhesive to the exposed surface of the multiple film layer 103 (an opposite surface to the printed layer 106: an upper surface in figure). In this way, the identification medium 100 in which the separator (not shown) is adhered to an adhesive surface, is produced.

Advantages

When an identification medium using the present invention is torn off from an adherend with the intention to reuse it, signs of it having been torn off clearly remain. Therefore, unauthorized reuse of the identification medium can be prevented. In addition, an authenticity confirming function can be obtained by a color-shift effect shown by merely looking at the cholesteric liquid crystal layer and the multiple film layer. Furthermore, an effect for switching between a visible state of the hologram and an invisible state thereof, can be confirmed by observing through a special viewer (a circular polarizing filter), and therefore, an authenticity confirming function can be carried out. In this way, the identification medium, which can clearly show signs of it having been opened and which can also have superior authenticity confirming function, can be obtained.

Other Matters

The optical function layer 200 may be formed of only the multiple film layer 103, without the cholesteric liquid crystal layer 101. In addition, the optical function layer 200 may be formed of only the cholesteric liquid crystal layer 101, without the multiple film layer 103. The cholesteric liquid crystal layer 101 may be formed on only a part of the label. Printing, of letters, shapes, etc., may be carried out on an upper surface or a lower surface of the cholesteric liquid crystal layer 101. Alternatively, the printing of letters, shapes, etc., may be carried out on an upper surface or a lower surface of the multiple film layer 103. This is also the same as in the case in which the optical function layer 200 is formed by only one of the cholesteric liquid crystal layer 101 and the multiple film layer 103.

The identification medium of the present invention can be used in techniques for confirming authenticity.

The invention claimed is:

1. An identification medium having a structure comprising, in the following order, as seen from the side of observation:
   a cholesteric liquid crystal layer or a multiple film layer, each of which reflects specific colors,
   a separation layer that is partially formed,
   a printed layer that is formed so as to cover the entire surface of a lower surface of the cholesteric liquid crystal layer or the multiple film layer, by using an opaque ink having specific colors, and
   a colored adhesive layer that is formed so as to cover the entire surface of a lower surface of the printed layer,
   wherein when an adhesive strength between the colored adhesive layer and an adherend is set to be Xa, an adhesive strength between the colored adhesive layer and the printed layer is set to be Xb, and an adhesive strength at a portion in which the separation layer is laminated between the optical function layer and the printed layer is set to be Xc, the adhesive strength of each part is set to satisfy:

$Xb > Xa > Xc$, and wherein the identification medium is configured such that, when the identification medium is torn off from the adherend,
   the printed layer and the colored adhesive layer are primarily separated from the cholesteric liquid crystal layer or the multiple film layer and absorbed into the adjacent printed layer and the adjacent colored adhesive layer to form a gap in an area at which the separation layer is formed under the cholesteric liquid crystal layer or the multiple film layer,
   the printed layer and the colored adhesive layer remain adhered to the cholesteric liquid crystal layer or the multiple film layer in a second area where the separation layer is not formed, and
   all portions of the printed layer and the colored adhesive layer are separated from the adherend.

* * * * *